United States Patent Office 3,285,987
Patented Nov. 15, 1966

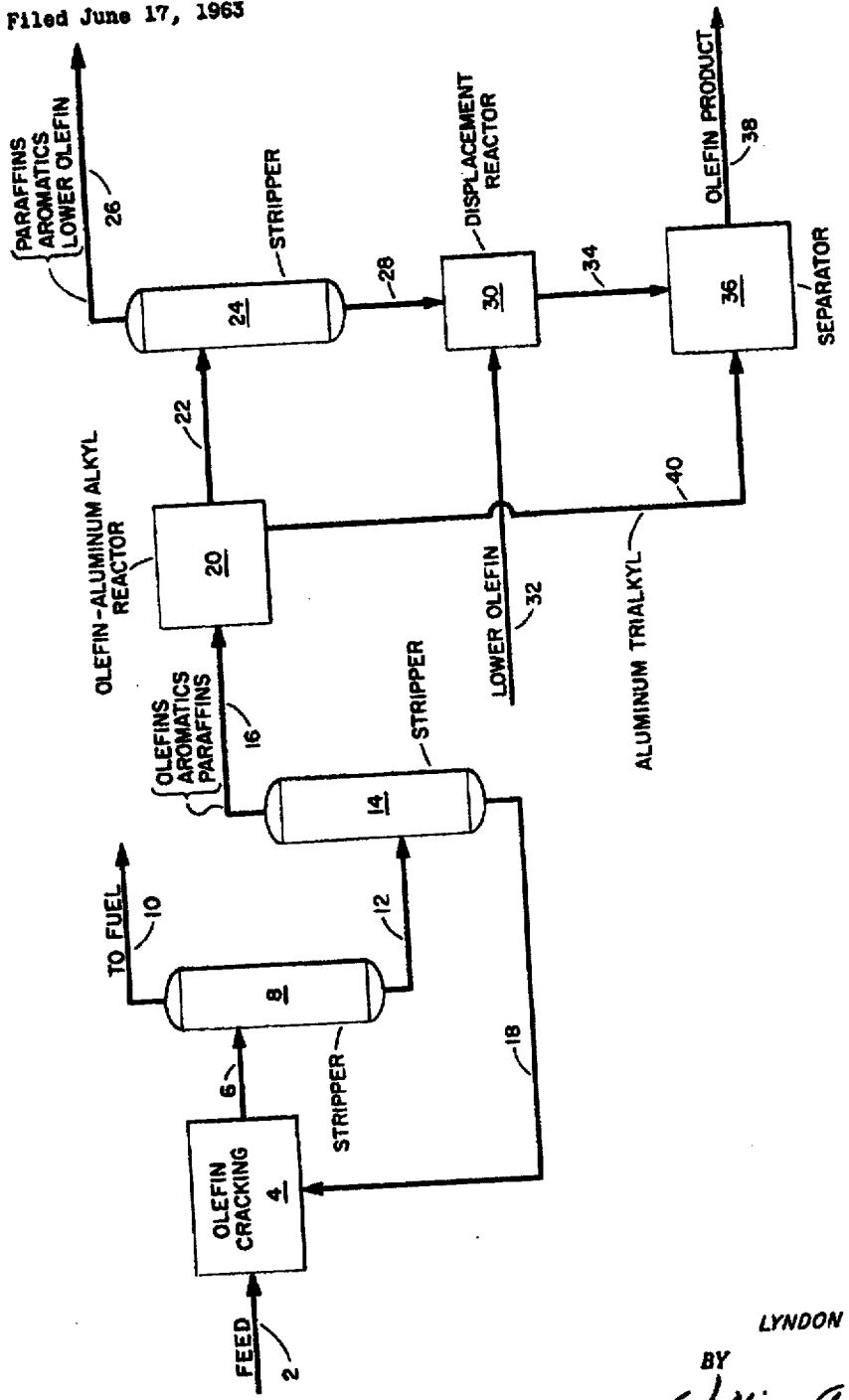

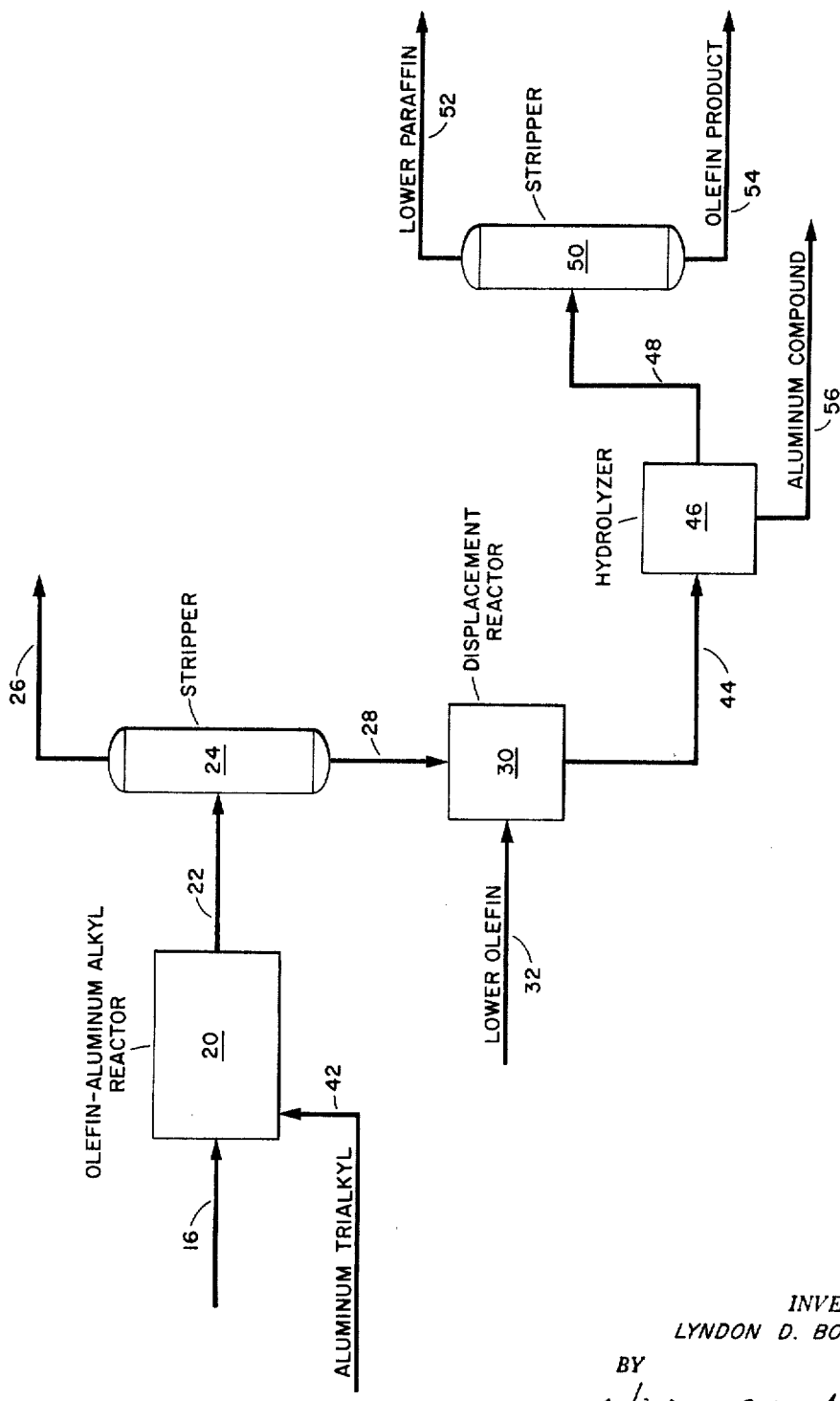

3,285,987
PURIFICATION OF ANTHRACENE
Louis A. Joo, Johnson City, and Harvey J. Young, Elizabethton, Tenn., assignors to Great Lakes Carbon Corporation, New York, N.Y., a corporation of Delaware
No Drawing. Filed Feb. 8, 1965, Ser. No. 431,200
18 Claims. (Cl. 260—675)

This invention in one aspect relates to the purification of various grades of anthracene. In another of its aspects the invention pertains to the solvent leaching of crude anthracene.

Anthracene as a chemical has many important uses. For instance, it is used as an ingredient in inks, coatings, and insecticides. It is also used as a starting point in the preparation of various dye stuffs. An important source of anthracene is coal tar. In the distillation of crude coal tar an anthracene oil cut is collected in the boiling range of 300° to 350° C. This cut is greenish in color turning brown when exposed to air, usually representing about nine percent of the original crude coal tar. It contains fluorene, anthracene, carbazole, phenanthrene and small amounts of other lesser known hydrocarbons. To remove oil the cresosote oil cut is cooled. As a consequence the distillate crystallizes to form a yellowish-green crude cake which is separated from the oily consituent by centrifuging, filter pressing or other means. The amount of anthracene in the crude cake depends upon the source of the coal tar. Generally the cake contains 10 to 45 weight percent anthracene.

Several methods such as distillation or azeotropic distillation and sublimation have been employed for the purification of crude anthracene. However, since phenanthrene, which is present in substantial amounts in anthracene cakes, has approximately the same boiling point as anthracene, the most important separation processes are based on the different solubilities of the anthracene cake constituents. The usual purification methods have been extraction or crystallization based on selective solubility of crude anthracene components. Most frequently phenanthrene and carbazole have been extracted from the anthracene cake. Numerous inorganic and organic solvents have been employed, such as sulfur dioxide, ammonia, ethanol, acetone, phenol, glycols, etc.

In the purification of crude anthracene by removing a phenanthrene-carbazole fraction by solvent leaching there are two considerations—yield and purity. Thus it is desirable to have a high recovery or yield, but it is also desirable to have a pure product. Unfortunately yield and purity do not go hand in hand. Generally when high purity anthracene is obtained the yield is very low.

This invention is based on the discovery that temperature is a parameter which can be correlated with a solvent to anthracene cake ratio in a given temperature range to cause the yield ($Y$) to approach the purity ($P$). In accordance with the practice of this invention it has been found that for a given fixed solvent to anthracene cake ratio, as the temperature ($T$) is decreased $\Delta Y/\Delta T$ increases more rapidly than $\Delta P/\Delta T$ decreases. Since the rate of increase in yield is greater than the decrease in purity, with a decrease in temperature, at some low temperature $Y=P$. While it is preferred that the yield and purity be equal, it will not always be practical to employ conditions such that $Y$ and $P$ are equal. Accordingly $Y$ should be within 10 percent of $P$. Thus the anthracene purification process is improved by the use of a temperature below 25° C. so correlated with the solvent ratio that percent $Y$ approaches the percent $P$. Stated differently the temperature and solvent ratio should be so correlated that the product of $Y$ and $P^2$ is a maximum ($P^2Y=$max.). A good test is that the $P^2Y$ be within 10 percent of this maximum value, and, more generally, $.25 < P^2Y < .73$ where percent P and Y are expressed as decimals.

The application of temperature as a parameter in the purification of crude anthracene is best illustrated by reference to specific examples, which, of course, are for the purpose of exemplification only. The extraction technique employed in obtaining all of the data reported herein was as follows. The crude anthracene cakes employed were obtained from several commercial sources.

EXAMPLE A

A 15 gram sample of crude anthracene cake was weighed into a 250 ml. beaker. The cake was then broken into small particles and a calculated amount of acetone was weighed in, the amount depending on what cake concentration in solvent was desired. The slurry obtained was then stirred for approximately two minutes at about 25° C. and the acetone weight was adjusted. The slurry was poured into a fritted disk filter, which was connected to a suction flask under vacuum. The acetone-slurry was allowed to dry and the solids recovered. The solids were dried overnight and weighed. From the dry product obtained, anthracene determinations were made using the maleic anhydride method of determination set forth in Chemical Abstracts, vol. 43, par. 8980$b$, 1949.

For low-temperature extractions, this same procedure was followed except that after the acetone was mixed with the crude cake, the beaker was placed in an acetone-Dry Ice bath and cooled to the desired temperature before filtration. Thus, the crushed crude anthracene and cold acetone are charged simultaneously into a cooled, well stirred vessel and are contacted for 10–15 minutes at $-15°$ C. to $-30°$ C. The slurry is transferred to a cooled filter press, the refined anthracene is recovered as a wet cake and subsequently dried. The filtrate, a solution of mainly phenanthrene and carbazole in acetone, is stripped of the acetone and the residual oil is disposed of as fuel oil. Depending upon the anthracene content and origin of the crude anthracene, two to nineteen parts of solvent are used for extraction of one part crude anthracene.

To show the effect of lowering the temperature according to the practice of this invention the following table is given. The solvent to cake ratio given in this and subsequent tables is on a weight basis. Thus at a 9:1 solvent: cake concentration 135 parts by weight of solvent are employed with a 15 part by weight anthracene cake.

Table A

Anthracene cake: 17.3 percent anthracene
Solvent:cake ratio: 3:1
Solvent: Acetone

| Extraction Temperature (° C.) | Purity (Percent) | Yield of Original Anthracene (Percent) |
|---|---|---|
| 34 | 84.5 | 41.5 |
| 18 | 87.5 | 61.2 |
| 13 | 84.1 | 61.8 |
| 8 | 83.5 | 69.0 |
| 0 | 85.8 | 72.8 |
| −9 | 83.8 | 73.8 |
| −10 | 85.4 | 77.3 |
| −20 | 48.1 | 73.8 |
| −35 | 37.4 | 96.8 |
| −50 | 34.8 | 100.0 |

Table A shows that with acetone, and a solvent:cake weight ratio of 3:1, the temperature wherein P²Y is a maximum is −10° C. P will be approximately equal to Y at a temperature between −10° C and −20° C.

It has been pointed out that for a given crude anthracene cake the low temperature is correlated with the solvent to anthracene cake weight ratio. The following table shows that whereas the most desirable temperature for use in the system of Table A is −10° C. to −20° C., the optimum temperature for this system is −20° C. to −30° C.

Table B

Anthracene cake: 25 percent anthracene
Solvent:cake ratio: 9:1
Solvent: Acetone

| Extraction Temperature (° C.) | Purity (Percent) | Yield of Original Anthracene (Percent) |
|---|---|---|
| 25 | 81.7 | 50.1 |
| −11 | 82.5 | 73.7 |
| −20 | 82.6 | 81.5 |
| −31 | 80.3 | 83.9 |

To further illustrate the relationship between temperature and solvent to anthracene cake weight ratio the following table is given.

Table C

Anthracene cake:
   25 percent anthracene (cake 1)
   25 percent anthracene (cake 2) (different source from cake 1)
   28 percent anthracene (cake 3)
   33 percent anthracene (cake 4)
Solvent: Acetone

| Solvent to Cake Ratio | Extraction Temperature (° C.) | Purity (Percent) | Yield of Original Anthracene (Percent) |
|---|---|---|---|
| Cake 1: | | | |
| 19:1 | −11 | 82.5 | 51.7 |
| 9:1 | −11 | 82.5 | 78.1 |
| 5.6:1 | −11 | 73.0 | 82.3 |
| Cake 2: | | | |
| 9:1 | −11 | 82.5 | 73.7 |
| 5.6:1 | −10 | 73.0 | 82.0 |
| 3:0 | −10 | 66.9 | 87.0 |
| Cake 3: | | | |
| 9:1 | 25 | 83 | 52 |
| 9:1 | −15 | 81 | 74 |
| 9:1 | −25 | 80 | 71 |
| Cake 4: | | | |
| 9:1 | 25 | 92 | 57 |
| 9:1 | −20 | 88 | 79 |
| 4:1 | 25 | 86 | 71 |
| 4:1 | −20 | 81 | 87 |

Table C demonstrates that with a cake containing about 25 percent anthracene, if the temperature is around −10° C. the solvent to cake ratio to be correlated therewith is between 5.6 and 9 to 1 in the case of acetone.

It has been pointed out that various solvents have been used in the purification of crude anthracene by solvent extraction. Those contemplated herein are the organic types such as aromatic hydrocarbons, heterocyclic compounds, ketones, and ethyl esters of saturated acids having less than four carbon atoms. Examples of solvents which are preferred and which have a greater affinity for benzene, xylene, toluene, acetone, methyl ethyl ketone, pyridine, the picolines, dioxane, furan, ethyl acetate and the like.

It is to be understood that while a lowering of the temperature at a certain solvent to cake ratio causes the yield to approach the purity, the temperature will not necessarily be below 0° C. because it will depend upon the freezing point of the solvent employed. The freezing point of benzene, for instance, is 5° C. whereas dioxane freezes at 12° C. Nevertheless, the following table shows that as the temperature approaches the freezing point, the yield value approaches the purity value.

Table D

Anthracene cake: 31 percent anthracene

| Solvent | Solvent to Cake Ratio | Extraction Temperature (° C.) | Purity (Percent) | Yield of Original Anthracene (Percent) |
|---|---|---|---|---|
| Benzene | 9:1 | 33 | 64.0 | 31.4 |
|  | 9:1 | 10 | 65.1 | 56.9 |
| Dioxane | 4:1 | 33 | 82.5 | 61.9 |
|  | 4:1 | 13 | 83.1 | 69.4 |
| Do | 2.3:1 | 33 | 66.7 | 71.6 |
|  | 2.3:1 | 13 | 73.7 | 77.5 |
| Pyridine | 9:1 | 33 | 92 | 16 |
|  | 9:1 | −20 | 88 | 62 |
| Do | 4:1 | 33 | 91 | 54 |
|  | 4:1 | −20 | 87 | 76 |
| Do | 2.3:1 | 33 | 86 | 64 |
|  | 2.3:1 | −20 | 84 | 78 |
| Ethyl Acetate | 9:1 | 33 | 86.5 | 47.5 |
|  | 9:1 | −20 | 75.5 | 76.5 |
| Do | 4:1 | 33 | 62.5 | 65.5 |
|  | 4:1 | −20 | 62.5 | 86.5 |

While the correlation of the solvent ratio and temperature is not exact, Table D shows that temperature is a parameter in the case of these solvents as well as with ketones.

Summarizing, the foregoing tables show that in the solvent leaching of crude anthracene the large difference between purity and yield can be decreased when the temperature is lowered to a certain level depending on the solvent to anthracene cake ratio. This condition is believed to obtain partly because the ratio of 2 to 19 parts solvent to 1 part cake by weight is less than that normally employed in the solvent extraction of phenanthrene, carbazole and the like from crude anthracene.

It was sought to determine whether the principles of this invention apply to crude anthracene from which its cresosote oil has not been completely removed. To make this determination creosote oil was added back to anthracene cakes such as employed in the foregoing examples separated from the oil by centrifuging. To one cake 15 percent creosote oil based on the cake was added back, and to another 30 percent oil.

Table E

Anthracene cake:
   28 percent anthracene (15% oil)
   24 percent anthracene (30% oil)
Solvent: Acetone
Solvent ratio: 9:1

| Extraction Temperature (° C.) | Purity (Percent) | Yield of Original Anthracene (Percent) | Percent Oil in Cake |
|---|---|---|---|
| Room | 87 | 36 | 15 |
| −20 | 82 | 66 | 15 |
| Room | 82 | 24 | 30 |
| −20 | 77 | 59 | 30 |

It can be seen that the principles of the invention do apply, although not as well, to crude anthracene from which all of the oil has not been removed. In addition it has been found that if the solvents of this invention are used in admixture with each other or in admixture with other known solvents for removing a phenanthrene-carbazole fraction from anthracene by solvent extraction, the principles of this invention apply. For instance a major amount of a solvent of this invention can be used in admixture with a minor amount of such other solvents as ethylene chloride, 2-propanol, N-hexane, ethanol, methanol or cyclohexane. Use of these mixtures is illustrated by the following data obtained as in the preceding examples.

Table F

Anthracene cake: 30.5 percent anthracene
Solvent ratio: 5.6 : 1

| Solvent | Extraction Temperature (°C.) | Purity (Percent) | Yield (Percent) |
|---|---|---|---|
| 85% Acetone-15% Methanol | 25 | 90.1 | 69.8 |
| 90% Acetone-10% Methanol | −20 | 89.5 | 85.0 |
| 80% Acetone-20% Methanol | −20 | 88.2 | 84.3 |

Thus mixtures such as the foregoing, and mixtures of solvents of the invention can be employed, for example, acetone-benzene and acetone-pyridine. Such modifications and variations as this will occur to those skilled in the art. These and other obvious ramifications are deemed to be within the scope of this invention.

What is claimed is:

1. In the process for purifying crude anthracene containing 10 to 45 weight percent anthracene in a crude cake wherein the crude cake is subjected to solvent leaching by a liquid-solid extraction process with a solvent selected from the group consisting of aromatic hydrocarbons, heterocyclic compounds, ketones, ethyl esters of saturated acids having less than four carbon atoms, and mixtures of these with each other and with other known anthracene cake extraction solvents to remove phenanthrene, carbazole and other impurities wherein at room temperature said solvent extraction process results in a large difference between purity and yield, the improvement of extracting the impurities at a lower temperature (T) in the range of 20° C. to −50° C. in combination with a ratio (R) of solvent to anthracene cake of 2:1 to 19:1 by weight so that percent yield (Y) approaches percent purity (P), R and T being so correlated that $.25 < P^2Y < .73$.

2. In the process for purifying crude anthracene containing 10 to 45 weight percent anthracene in a crude cake wherein the crude cake is subjected to solvent leaching by a liquid-solid extraction process with a solvent selected from the group consisting of aromatic hydrocarbons, heterocyclic compounds, ketones, ethyl esters of saturated acids having less than four carbon atoms, and mixtures of these with each other and with other known anthracene cake extraction solvents to remove phenanthrene, carbazole and other impurities wherein at room temperature said solvent extraction process results in a large difference between purity and yield, the improvement of extracting the impurities at a lower temperature (T) in the range of 20° C. to −50° C. in combination with a ratio (R) of solvent to anthracene cake of 2:1 to 19:1 by weight so that percent yield (Y) approaches percent purity (P), R and T being so correlated that $P^2Y$ is within 10 percent of its maximum.

3. In the process for purifying crude anthracene containing 10 to 45 weight percent anthracene in a crude cake wherein the crude cake is subjected to solvent leaching by a liquid-solid extraction process with a solvent selected from the group consisting of aromatic hydrocarbons, heterocyclic compounds, ketones, ethyl esters of saturated acids having less than four carbon atoms, and mixtures of these with each other and with other known anthracene cake extraction solvents to remove phenanthrene, carbazole and other impurities wherein at room temperature said solvent extraction process results in a large difference between purity and yield, the improvement of extracting the impurities at a lower temperature (T) in the range of 20° C. to −50° C. in combination with a ratio (R) of solvent to anthracene cake of 2:1 to 19:1 by weight so that percent yield (Y) approaches percent purity (P), R and T being so correlated that $P^2Y$ is a maximum.

4. In the process for purifying crude anthracene containing 10 to 45 weight percent anthracene in a crude cake wherein the crude cake is subjected to solvent leaching by a liquid-solid extraction process with a solvent selected from the group consisting of aromatic hydrocarbons, heterocyclic compounds, ketones, ethyl esters of saturated acids having less than four carbon atoms, and mixtures of these with each other and with other known anthracene cake extraction solvents to remove phenanthrene, carbazole and other impurities, the improvement of extracting the impurities at a temperature (T) below 25° C. correlated with a solvent ratio (R) of solvent to anthracene cake of from 2:1 to 19:1 by weight so that percent yield (Y) and percent purity (P) are within 10 percent of each other by virtue of T being employed which, at a given R and for a given anthracene cake, results in Y being within the 10 percent of P.

5. In the process for purifying crude anthracene containing 20 to 45 weight percent anthracene in a crude cake wherein the crude cake is subjected to solvent leaching by a liquid-solid extraction process with a solvent selected from the group consisting of aromatic hydrocarbons, heterocyclic compounds, ketones, ethyl esters of saturated acids having less than four carbon atoms, and mixtures of these with each other and with other known anthracene cake extraction solvents to remove phenanthrene, carbazole and other impurities, the improvement of extracting the impurities at a temperature (T) below 25° C. correlated with a solvent ratio (R) of solvent to anthracene cake of from 2:1 to 19:1 by weight so that P and Y are approximately equal $\Delta Y/\Delta T$ increasing more rapidly than $\Delta P/\Delta T$ decreases, with a decrease in T.

6. In the process for purifying crude anthracene containing 15 to 45 weight percent anthracene in a crude cake wherein the crude cake is subjected to solvent leaching by a liquid-solid extraction process with a solvent selected from the group consisting of aromatic hydrocarbons, heterocyclic compounds, ketones, ethyl esters of saturated acids having less than four carbon atoms, and mixtures of these with each other and with other known anthracene cake extraction solvents to remove phenanthrene, carbazole and other impurities, the improvement of extracting the impurities at a temperature (T) in the range of 10° C. to −50° C. correlated with a solvent ratio (R) of solvent to anthracene cake of from 2:1 to 19:1 by weight so that Y and P are approximately equal, P varying directly with R and T, and
Y varying inversely with R and T 7. The process of claim 4 wherein the anthracene cake contains 15 to 45 weight percent anthracene, wherein the solvent is acetone, wherein the temperature (T) is in the range of 10° C. to −50° C., and wherein the solvent ratio (R) of acetone to anthracene cake is from 2:1 to 19:1.

8. The process of claim 4 wherein the anthracene cake contains 15 to 30 weight percent anthracene, wherein the solvent is acetone, wherein the temperature (T) is in the range of 15° C. to −30° C., and wherein the solvent ratio (R) of pyridine to anthracene cake is about 2:1 to 9:1.

9. The process of claim 4 wherein the anthracene cake contains 30 to 40 weight percent anthracene, wherein the solvent is acetone, wherein the temperature (T) is in the range of 15° C. to −30° C., and wherein the solvent ratio (R) of acetone to anthracene cake is from 6:1 to 19:1.

10. The process of claim 4 wherein the anthracene cake contains 25 to 40 weight percent anthracene, wherein the solvent is pyridine, wherein the temperature (T) is in the range of 20° C. to −25° C., and wherein the solvent ratio (R) of pyridine to anthracene cake is about 2:1 to 9:1.

11. The process of claim 4 wherein the anthracene cake contains 25 to 40 weight percent anthracene, wherein the solvent is benzene, wherein the temperature (T) is in the range of 20° C. to 6° C., and wherein the solvent ratio (R) of benzene to anthracene cake is about 9:1 to 19:1.

12. The process of claim 4 wherein the anthracene cake contains about 33 weight percent anthracene, wherein the solvent is acetone, wherein the temperature (T) is in the range of about −20 C. and wherein the solvent ratio (R) of acetone to anthracene cake is from 4:1 to 9:1.

13. The process of claim 4 wherein the anthracene cake contains about 28 weight percent anthracene, wherein the solvent is acetone, wherein the temperature (T) is in the range of −15° C. to −20° C., and wherein the solvent ratio (R) of acetone to anthracene cake is about 9:1.

14. The process of claim 4 wherein the anthracene cake contains about 17 weight percent anthracene, wherein the solvent is acetone, wherein the temperature (T) is in the range of −9° C. to −12° C., and wherein the solvent ratio (R) of acetone to anthracene cake is about 3:1.

15. The process of claim 4 wherein the anthracene cake contains about 31 weight percent anthracene, wherein the solvent is dioxane, wherein the temperature (T) is in the range of 20° C. to 13° C., and wherein the solvent ratio (R) of dioxane to anthracene cake is about 2:1 to 9:1.

16. The process of claim 4 wherein the anthracene cake contains about 31 weight percent anthracene, wherein the solvent is pyridine, wherein the temperature (T) is in the range of 20° C. to −25° C. and wherein the solvent ratio (R) of pyridine to anthracene cake is about 2:1 to 9:1.

17. The purpose of claim 4 wherein the anthracene cake contains about 31 weight percent anthracene, wherein the solvent is benzene, wherein the temperature (T) is in the range of 20° C. to 6° C. and wherein the solvent ratio (R) of benzene to anthracene cake is about 9:1 to 19:1.

18. The process of claim 4 wherein the anthracene cake contains about 33 weight percent anthracene, wherein the solvent is a mixture of acetone and methanol, wherein the temperature (T) is in the range of −15° C. to −20° C., and wherein the solvent ratio (R) of solvent to anthracene cake is about 6:1.

References Cited by the Examiner
UNITED STATES PATENTS

| 2,764,595 | 9/1956 | De jong | 260—675 |
| 2,767,232 | 10/1956 | Kleiss et al. | 260—675 |
| 2,783,287 | 2/1957 | Nickolls et al. | 260—675 |
| 2,828,346 | 3/1958 | Swaney | 260—675 |

DELBERT E. GANTZ, *Primary Examiner.*

G. E. SCHMITKONS, *Assistant Examiner.*